No. 781,074. PATENTED JAN. 31, 1905.
C. M. JOHNSON.
CARRIER STOPPING MECHANISM FOR DESPATCH APPARATUS.
APPLICATION FILED APR. 27, 1904.
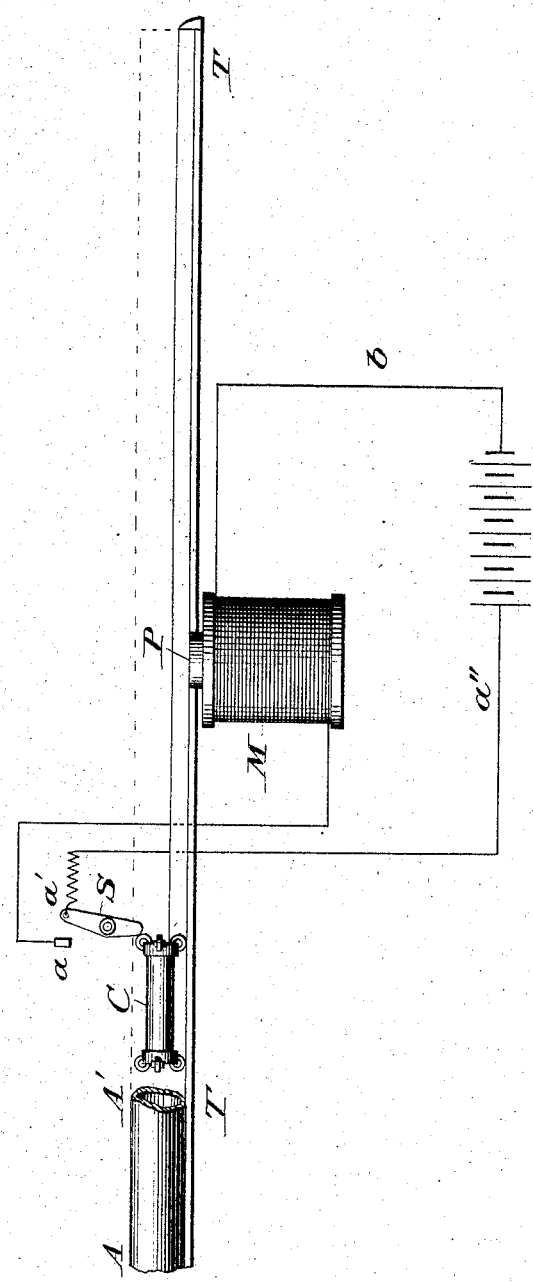
Witnesses:
Inventor:
Charles M. Johnson.

No. 781,074.

Patented January 31, 1905.

UNITED STATES PATENT OFFICE.

CHARLES M. JOHNSON, OF COLCHESTER, ILLINOIS.

CARRIER-STOPPING MECHANISM FOR DESPATCH APPARATUS.

SPECIFICATION forming part of Letters Patent No. 781,074, dated January 31, 1905.

Application filed April 27, 1904. Serial No. 205,265.

*To all whom it may concern:*

Be it known that I, CHARLES M. JOHNSON, a citizen of the United States, residing at Colchester, in the county of McDonough and State of Illinois, have invented a new, novel, and useful Carrier-Stopping Mechanism for Despatch Apparatus, of which the following is a specification.

My invention relates to improvements in carrier-stopping mechanism for despatch apparatus; and it consists of certain novel features hereinafter described, and particularly pointed out in the claims.

One method of operation consists of applying this device to the terminals or stations of pneumatic tubes, so that a moving pneumatic carrier may be stopped at the station with less noise and wear of both carrier and terminal.

I attain these objects by the mechanism illustrated in the accompanying drawing, in which—

A A' represent a broken station-section of a pneumatic tube; T T', the terminal; M, the magnet; S, the switch; C, the carrier, and $a''$ $b$ the electric wires. For an illustration we will say that there is in use upon this pneumatic tube the pressure system of operation, with an air-cushion at the point A A'. Now if the carriers were all the same weight and all possessed the same diameters the air-cushion would do the work at small cost; but the carriers have a variable load and a variable diameter. The result is a constant pounding of the terminal end T', resulting in considerable noise and expense. To overcome these difficulties, I apply an electric circuit and a magnet in which the carrier C, traveling upon the way, comes in contact with the switch-lever S, rocks the switch-lever, closes the electric circuit between the points $a$ $a'$, which energizes the magnet M, (the carrier-wheels, frame, or body being composed of a magnetic substance,) and as soon as the carrier comes in contact with the pole P of the magnet M the carrier is stopped. The operator then can throw the switch S, break the electric circuit at $a$ $a'$, move the carrier past the pole P of the magnet, and the device is ready to stop another carrier. I of course can use a solenoid to accomplish the same results and could also use a long armature-bar or two or more magnets, so as to make the magnetic pull more gradual; but I prefer the annexed drawing, which is simple in construction, to show the principle of the invention.

I do not limit myself to this particular description of the invention, for there are other uses and purposes to which this invention may be applied without departing from the spirit of the invention.

I therefore claim—

1. In a carrier-stopping mechanism for despatch apparatus, a way, a carrier adapted to travel on said way, an electric circuit normally open and adapted to be closed by the carrier on its travel, and means energized by said electric circuit for stopping the carrier by the direct action of the magnetic fluid.

2. In a carrier-stopping mechanism for despatch apparatus, a way, a carrier adapted to travel on said way, an electric circuit normally open and adapted to be closed by the carrier on its travel, and a magnet energized by said electric circuit for stopping the carrier by the direct action of the magnetic fluid.

3. In a carrier-stopping mechanism for despatch apparatus, a way, a carrier adapted to travel on said way, an electric circuit normally open and adapted to be closed by the carrier on its travel, means energized by said electric circuit for stopping the carrier by the direct action of the magnetic fluid, and a switch for breaking said circuit to release the carrier.

4. In a carrier-stopping mechanism for despatch apparatus, a way, a carrier adapted to travel on said way, an electric circuit normally open and adapted to be closed by the carrier on its travel, a magnet energized by said electric circuit for stopping the carrier by the direct action of the magnetic fluid, and a switch for breaking said circuit to release the carrier.

5. In a carrier-stopping mechanism for despatch apparatus, a way, a carrier adapted to travel on said way, an electric circuit normally open, a switch for closing said circuit and operated by the carrier in its travel to close said circuit, and means energized by said circuit for stopping the carrier by the direct action of the magnetic fluid.

6. In a carrier-stopping mechanism for despatch apparatus, a way, a carrier adapted to travel on said way, an electric circuit normally open, a switch for closing said circuit and operated by the carrier in its travel to close said circuit, and a magnet energized by said circuit for stopping the carrier by the direct action of the magnetic fluid.

7. In a carrier-stopping mechanism for despatch apparatus, a way, a carrier adapted to travel on said way, an electric circuit normally open, means energized by said circuit for stopping the carrier by the direct action of the magnetic fluid, and a switch operated by the carrier in its travel to close said circuit and adapted to be operated to break said circuit to release said carrier.

CHARLES M. JOHNSON.

Witnesses:
I. N. BOYD,
HOWARD C. MOORE.